United States Patent
Takeda et al.

(10) Patent No.: US 11,856,562 B2
(45) Date of Patent: Dec. 26, 2023

(54) TERMINAL, APPARATUS, AND SYSTEM

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 171 days.

(21) Appl. No.: 17/487,702

(22) Filed: Sep. 28, 2021

(65) Prior Publication Data

US 2022/0022185 A1  Jan. 20, 2022

Related U.S. Application Data

(63) Continuation of application No. 16/635,369, filed as application No. PCT/JP2017/028113 on Aug. 2, 2017, now Pat. No. 11,160,073.

(51) Int. Cl.
*H04W 72/0446* (2023.01)
*H04L 5/00* (2006.01)
(Continued)

(52) U.S. Cl.
CPC ....... *H04W 72/0446* (2013.01); *H04L 5/0094* (2013.01); *H04W 28/26* (2013.01); *H04W 72/23* (2023.01)

(58) Field of Classification Search
CPC .. H04L 5/0094; H04W 72/23; H04W 72/0446
(Continued)

(56) References Cited

U.S. PATENT DOCUMENTS 11,160,073 B2 * 10/2021 Takeda ................. H04L 5/0094
2018/0049169 A1   2/2018 Lin et al.
(Continued)

FOREIGN PATENT DOCUMENTS

WO   2017052204 A1   3/2017

OTHER PUBLICATIONS

International Search Report issued in PCT/JP2017/028113 dated Oct. 17, 2017 (1 page).
(Continued)

*Primary Examiner* — Peter G Solinsky
(74) *Attorney, Agent, or Firm* — Osha Bergman Watanabe & Burton LLP

(57) ABSTRACT

A terminal is disclosed including a receiver that receives configuration information; and a processor that controls receiving processes for Physical Downlink Shared Channel (PDSCH), wherein the processor controls the receiving processes for the PDSCH under an assumption that the PDSCH is not allocated in a first reserved resource corresponding to the first configuration information, when the receiver receives first configuration information about a Bandwidth part (BWP)-specific reserved resource as the configuration information, and controls the receiving processes for the PDSCH under an assumption that the PDSCH is not allocated in a second reserved resource corresponding to the second configuration information, when the receiver receives second configuration information about a cell-specific reserved resource as the configuration information. In other aspects, an apparatus and a system are also disclosed.

6 Claims, 13 Drawing Sheets

(51) Int. Cl.
  *H04W 28/26* (2009.01)
  *H04W 72/23* (2023.01)
(58) Field of Classification Search
  USPC .......................................................... 370/329
  See application file for complete search history.

(56) References Cited

U.S. PATENT DOCUMENTS

| | | | |
|---|---|---|---|
| 2018/0220444 | A1 | 8/2018 | Lee et al. |
| 2018/0324678 | A1 | 11/2018 | Chen et al. |
| 2019/0342870 | A1 | 11/2019 | Shen et al. |
| 2020/0077470 | A1 | 3/2020 | Xiong et al. |
| 2020/0344034 | A1 | 10/2020 | Moon et al. |
| 2021/0092717 | A1 | 3/2021 | Takeda et al. |

OTHER PUBLICATIONS

Written Opinion of the International Searching Authority issued in PCT/JP2017/028113 dated Oct. 17, 2017 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 NR Ad-Hoc#2; R1-1710696 "Multiplexing NR-PDCCH and PDSCH" Samsung; Qingdao, P.R. China; Jun. 27-30, 2017 (6 pages).
3GPP TSG RAN WG1 Meeting #89; R1-1707995 "DCI Contents for NR" Samsung; Hangzhou, China; May 15-19, 2017 (5 pages).
3GPP TSG RAN WG2#99; R2-1707624 "LS on Bandwidth Part Operation in NR" Qingdao, P.R. China; Jun. 27-30, 2017 (3 pages).
Extended European Search Report issued in European Application No. 17920115.7, dated Feb. 17, 2021 (9 pages).
Office Action issued in Indian Application No. 202037004721; dated Mar. 22, 2022 (7 pages).
Office Action issued in Chinese Application No. 201780095244.4; dated Feb. 15, 2023 (12 pages).
3GPP TSG-RAN WG1 NR-Ad-Hoc#2; R1-1711998 "LS on Bandwidth Part Operation in NR" Qingdao, P.R. China; Jun. 27-30, 2017 (3 pages).

* cited by examiner

TERMINAL, APPARATUS, AND SYSTEM

CROSS-REFERENCE TO RELATED APPLICATIONS

The present application is a continuation application and, thereby, claims benefit under 35 U.S.C. § 120 to U.S. patent application Ser. No. 16/635,369 filed on Jan. 30, 2020, titled, "USER TERMINAL AND RADIO COMMUNICATION METHOD," which is a national stage application of PCT Application No. PCT/JP2017/028113, filed on Aug. 2, 2017. The contents of these applications are incorporated by reference in their entirety.

TECHNICAL FIELD

This disclosure relates to a terminal, an apparatus, and a system in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

Furthermore, in existing LTE systems (for example, LTE Rel. 8 to 13), downlink (DL) and/or uplink (UL) communication are carried out by using subframes of 1 ms as scheduling units. For example, when using normal cyclic prefixes, the subframe is comprised of 14 symbols at a subcarrier spacing of 15 kHz. This subframe is also referred to as a "transmission time interval (TTI)" and so on.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, NR), research is underway to configure one or more bandwidth parts (BWPs), included in a component carrier (CC) or a system bandwidth, for a user terminal (UE (User Equipment)). A BWP for use in DL communication may be referred to as a "DL BWP," and a BWP for use in UL communication may be referred to as a "UL BWP."

Envisaging NR, research is underway so as to make it possible to reserve given time/frequency resources in time units that serve as data channel scheduling units (for example, slots and/or mini-slots) for future scalability. These given time/frequency resources may be referred to as "unknown resources," "reserved resources," "blank resources," "unused resources" and/or the like.

In NR, it is likely that BWP-based control will be implemented. Nevertheless, not much research has been conducted on how to allow UE to identify blank resources when BWPs are introduced. Unless a proper method for selecting blank resources is introduced, flexible control is not possible, and there may be a decline in communication throughput, spectral efficiency and so on.

It is therefore an object of the present invention to provide a user terminal and a radio communication method, whereby, even when BWP-based control is implemented, the decline in communication throughput and the like can be reduced.

Solution to Problem

A user terminal according to one aspect of the present invention includes a control section that selects a blank resource region that is configured in association with a certain bandwidth part (BWP), and a transmitting/receiving section that performs transmission and/or receiving processes by taking into account the blank resource region.

Advantageous Effects of Invention

According to one example of the present disclosure, even when BWP-based control is implemented, the decline in communication throughput and the like can be reduced.

DESCRIPTION OF EMBODIMENTS

Envisaging future radio communication systems (for example, at least one of NR, 5G and 5G+, which hereinafter will be simply referred to as "NR"), research is underway to use time units that are different from the subframes for existing LTE systems (for example, LTE Rel. 8 to 13) (for example, slots and/or mini-slots, one or more OFDM symbols, etc.) as scheduling units for data channels.

Note that a data channel may be a DL data channel (for example, a downlink shared channel (PDSCH (Physical Downlink Shared CHannel))), a UL data channel (for example, an uplink shared channel (PUSCH (Physical Uplink Shared CHannel))) and/or the like, and may be simply referred to as a data or a shared channel.

Here, a slot is a time unit that depends on what numerology (for example, subcarrier spacing and/or symbol duration) UE uses. The number of symbols per slot may be determined by subcarrier spacing. For example, if the subcarrier spacing is 15 kHz or 30 kHz, the number of symbols per slot may be 7 or 14. Meanwhile, when the subcarrier spacing is 60 kHz or greater, the number of symbols per slot may be 14. A mini-slot is a unit of time with a shorter time length (or fewer symbols) than a slot.

Figure 1:
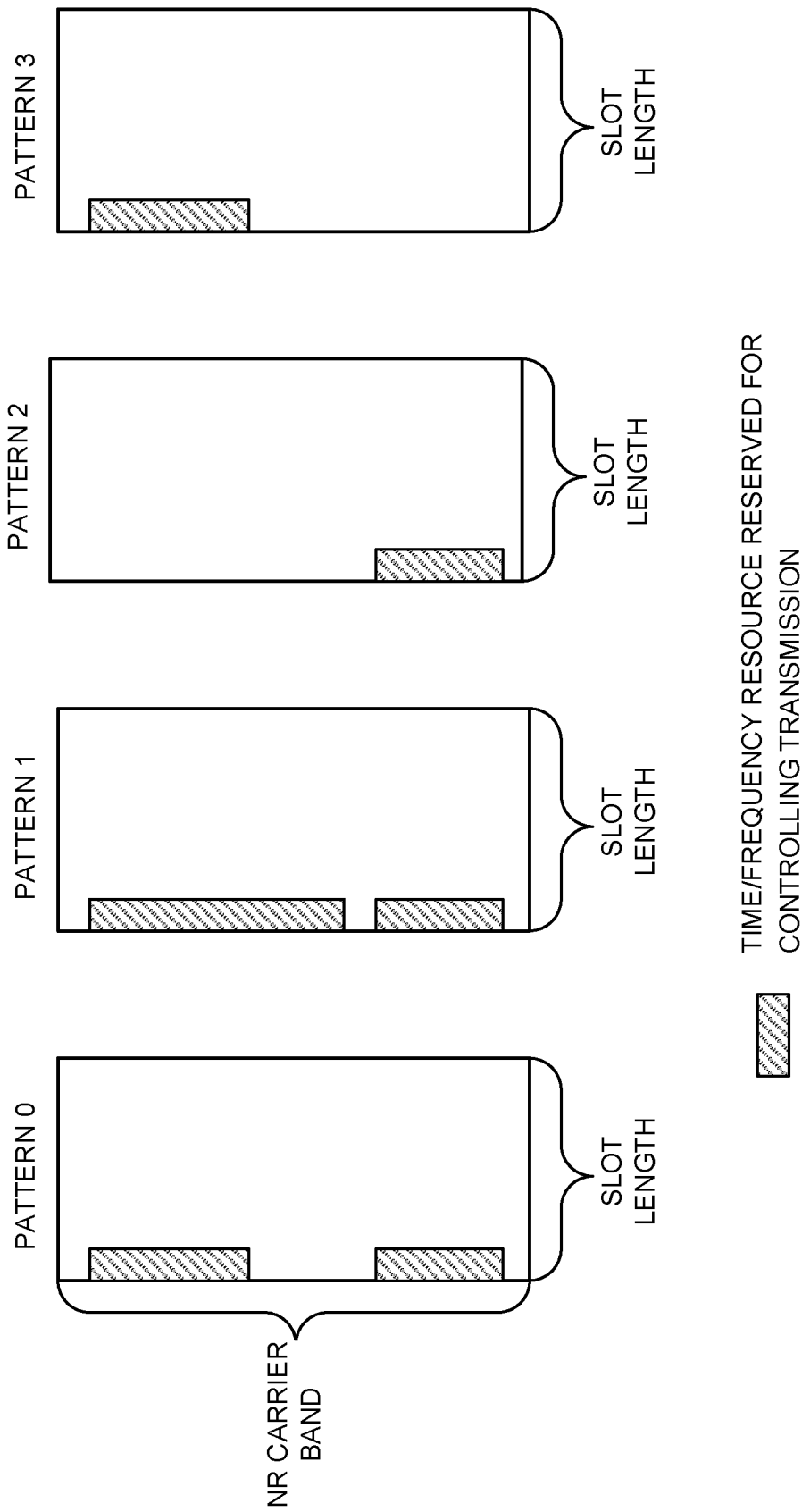
FIG. 1 is a diagram to show an example of resource sharing between a DL control channel and a DL data channel.

Envisaging NR, studies are in progress to share resources (which may be referred to as "resource sharing," and the like) between a DL control channel (for example, "PDCCH (Physical Downlink Control CHannel)") and a DL data channel (for example, PDSCH). FIG. 1 is a diagram to show an example of resource sharing between a DL control channel and a DL data channel.

As shown in FIG. 1, given time and/or frequency resources are reserved for a DL control channel, and the DL control channel is allocated to at least part of the given time and/or frequency resources.

That is, these given time and/or frequency resources may include candidate regions for allocating one or more DL control channels, and these candidate regions may be referred to as a "control resource set (CORESET)," a "control subband," a "search space set," a "search space resource set," a "control field," a "control subband," an "NR-PDCCH field" and/or the like.

These given time and/or frequency resources may be referred to as "reserved resources" and so on. Reserved resources may assume varying configurations (which may be referred to as "patterns," "reserved resource patterns," etc.) depending on, for example, the number of UEs scheduled in a slot, UE capabilities, and the like. Reserved resources may correspond to the whole range of a CORESET that may be used by one or more UEs in given time unit.

As shown in FIG. 1, multiple reserved resource patterns (here, patterns 0 to 3) may be configured semi-statically in UE (by higher layer signaling (for example, by radio resource control (RRC) signaling, broadcast information (master information block (MIB)), system information block (SIB), etc.) and so on).

The UE may receive configuration information of CORESETs (which may be referred to as "CORESET configurations") from the base station (may be referred to as, for example, a "BS," "transmission/reception point (TRP)," an "eNB (eNode B)," a "gNB," etc.). CORESET configurations may be reported, for example, by way of higher layer signaling (for example, RRC signaling and/or SIB).

The UE monitors (blind-decodes) one or more CORESETs (or the search spaces in these CORESETs) configured in the UE to detect the DL control channel (downlink control information (DCI)) for that UE.

The reserved resource pattern to use in a certain slot may be dynamically indicated by given DCI, from among a number of reserved resource patterns. The given DCI may be reported by using a PDCCH that is used in common by one or more UEs (the given DCI and the PDCCH in this case may be referred to as "group-common DCI," a "group-common PDCCH," and so on, respectively), may be reported by using UE-specific PDCCHs (the given DCI may be referred to as "scheduling DCI," etc.), or may be reported in a downlink control channel that is not a PDCCH.

Note that the DCI to schedule receipt of DL data (for example, PDSCH) and/or measurements of DL reference signals may be referred to as "DL assignment," "DL grant," "DL DCI," and so on. Note that the DCI to schedule transmission of UL data (for example, PUSCH) and/or transmission of UL sounding (measurement) signals may be referred to as "UL grant," "UL DCI," and so on.

The UE may perform receiving processes (such as decoding) for DL data channels based on dynamically-indicated reserved resource patterns and DL assignments. The UE may also perform transmission processes (such as coding) for UL data channels based on dynamically-indicated reserved resource patterns and UL assignments.

Note that the NR carrier band in FIG. 1 may be a component carrier (CC), which is allocated to UE (which is, for example, 200 MHz, and which may be also referred to as a "system band" and the like), or may be a bandwidth part (BWP), which is at least a part of the CC. One or more BWPs are configured in UE.

Information about the configuration of each BWP configured in UE may include information that shows at least one of the numerology, the frequency location (for example, the center frequency), the bandwidth (for example, the number of resource blocks (also referred to as "RBs (Resource Blocks)," "PRBs (Physical RBs)," etc.)) and the time resource (for example, slot (mini-slot) indices, cycle, etc.) of each BWP. This configuration information may be reported to the UE by higher layer signaling or MAC (Medium Access Control) signaling.

NR is expected to be standardized stepwise—that is, NR may undergo initial introduction (in, for example, 5G, LTE Rel. 15 or later releases, or phase 1), and then the initially-introduced specifications may undergo continuous evolution (into, for example, 5G+, LTE Rel. 16 or later releases, or phase 2). Consequently, it is desirable to configure the time unit (for example, slots and/or mini-slots) to serve as the unit of data channel scheduling in consideration of future scalability (forward compatibility).

So, research is underway to reserve given time/frequency resources in time units that serve as data channel scheduling units (for example, slots and/or mini-slots) for forward compatibility. These given time/frequency resources may be referred to as "unknown resources," "reserved resources," "blank resources," "unused resources" and/or the like. Blank resources may be configured as reserved resources, which have been described earlier with reference to FIG. 1 (and may overlap at least in part with reserved resources), or may be configured apart from these reserved resources.

Figure 2:
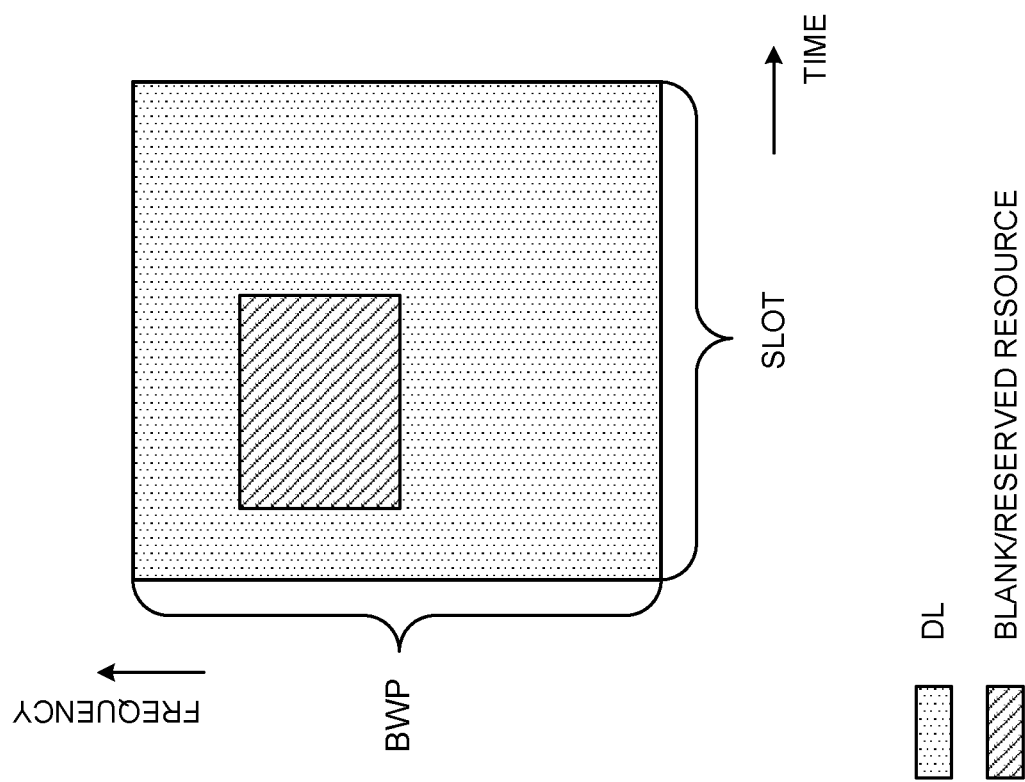
FIG. 2 is a diagram to show an example of a blank resource.

FIG. 2 is a diagram to show an example of a blank resource. As shown in FIG. 2, a blank resource may be constituted by at least part of the symbols in a slot and/or at least part of the PRBs in a carrier (or a BPW). UE may not assume (or implement) transmitting/receiving control and/or operations for this blank resource.

For example, referring to FIG. 2, a PDSCH for UE may be allocated in the slot. Meanwhile, the UE may perform receiving processes for the PDSCH (for example, at least one of demodulation, decoding, rate matching, etc.) on the assumption that no PDSCH is allocated to the blank resource in this slot.

In NR, it is likely that BWP-based control will be implemented. Nevertheless, not much research has been conducted on how to allow UE to identify blank resources when BWPs are introduced. Unless a proper method for selecting blank resources is introduced, flexible control is not possible, and there may be a decline in communication throughput, spectral efficiency and so on.

So, the present inventors have come up with the idea of properly identifying the blank resource region that is configured in association with a given BWP, and reducing the decline in communication throughput and so on.

Now, embodiments of the present invention will be described below in detail with reference to the accompanying drawings. Note that, in the following description, BWPs may be interpreted as meaning DL BWPs, UL BWPs, or other BWPs.

First Example

In the first example of the present invention, information related to a set of one or more blank resources (which may be referred to as a "blank resource pattern," a "blank resource region," etc.) is determined based on BWP configuration. This information may be referred to as "blank resource information." For every BWP, one or more corresponding blank resource patterns may be configured in UE.

Blank resources may be defined in time units that serve as data channel scheduling units. These time units may be represented by one or more symbols, mini-slots, slots, subframes, and so forth.

The blank resource information may include information about the frequency resources of one or more blank resources (for example, the starting PRB index, the number of PRBs, etc.), information about the time resources of one or more blank resources (for example, the indices, number, length and cycle of given time units (symbols, mini-slots, slots, etc.), information about the indices of one or more blank resource patterns, and so on.

Every BWP configuration may include blank resource information explicitly or implicitly. BWP configurations to include blank resource information may be reported by using, for example, higher layer signaling (for example, RRC signaling, SIBs, etc.).

The UE may select blank resource information based on information related to at least one of the numerology (for example, the SCS), the location in frequency (for example, the center frequency), the bandwidth (for example, the number of PRBs) and so on of the BWPs that are configured (and/or that are active). UE may specify possible blank resource patterns based on which BWP is active.

The UE may select blank resource information, based on information related to time resources such as system frame numbers, slot (mini-slot) indices, subframe indices, and so on, in the period specified by this information.

The UE may specify the blank resource pattern to assume in the active BWP based on higher layer signaling, physical layer signaling (for example, DCI) or a combination of these. For example, the UE may select the blank resource pattern to assume in the active BWP based on one piece of blank resource information, which is specified based on given DCI amongst one or more pieces of blank resource information configured. Here, the given DCI may be scheduling DCI or group-common DCI.

Figure 3:
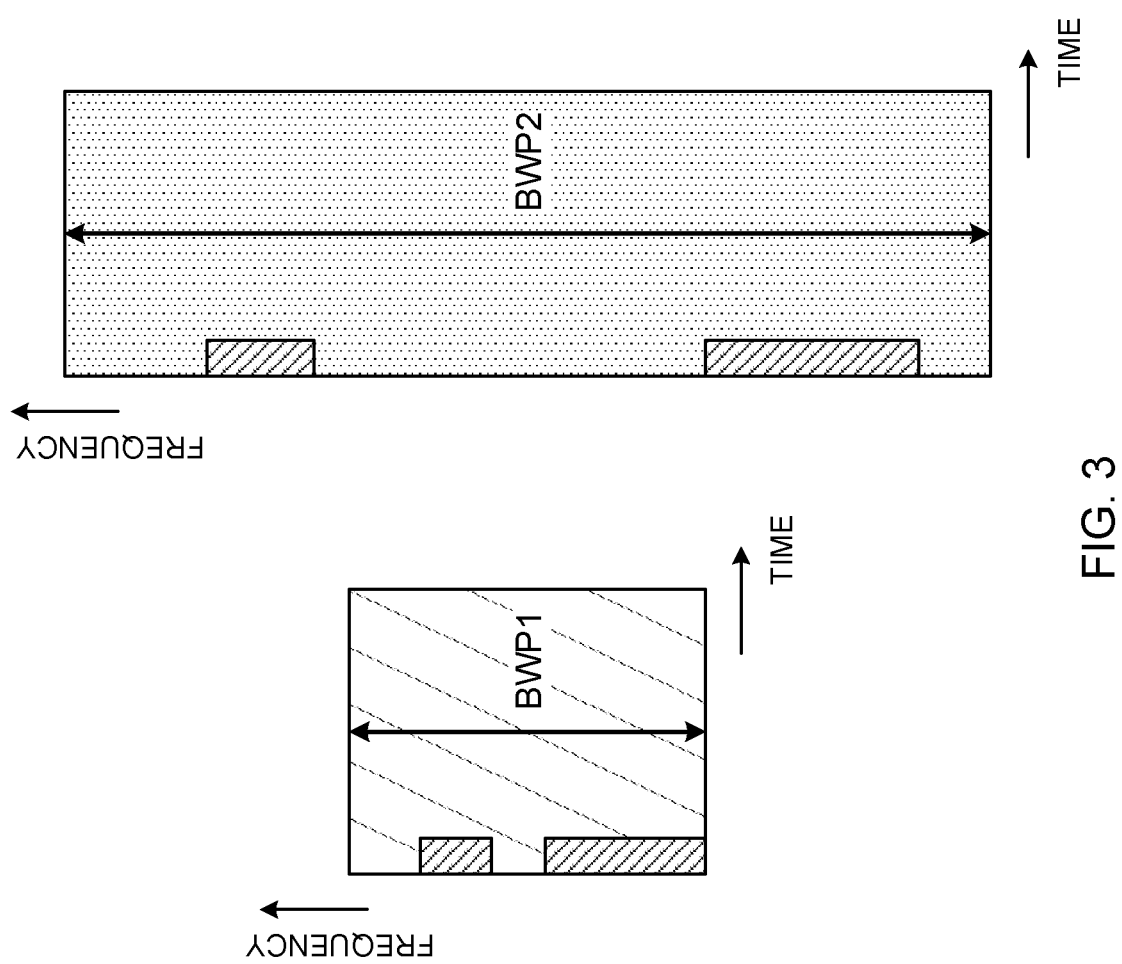
FIG. 3 is a diagram to show examples of associations between BWPs and blank resources according to a first example of the present invention.

FIG. 3 is a diagram to show examples of associations between BWPs and blank resources according to the first example of the present invention. In this example, BWP 1 and BWP 2 have varying bandwidths. The blank resources in BWP 1 and the blank resources in BWP 2 are configured independently, and may be located in different resources in a given slot.

Figure 4:
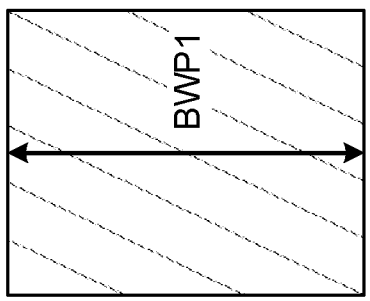
FIG. 4 is a diagram to show other examples of associations between BWPs and blank resources according to the first example.
Figure 4:
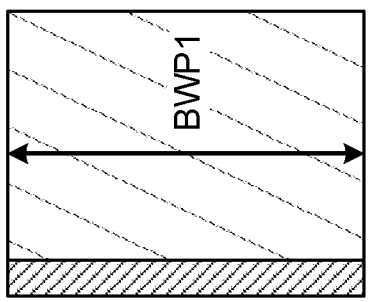
Figure 4:
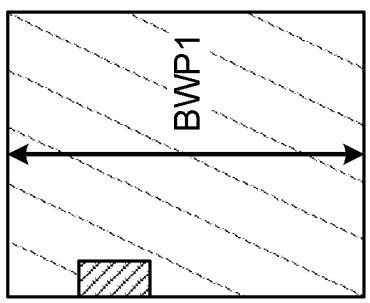
Figure 4:
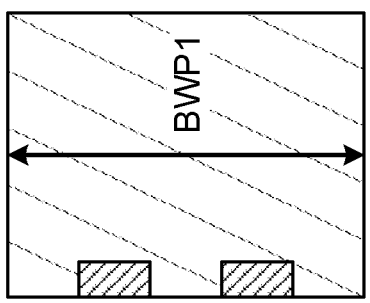
Figure 4:
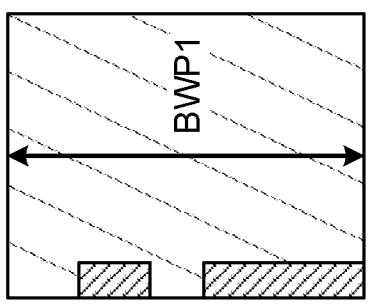
Figure 5:
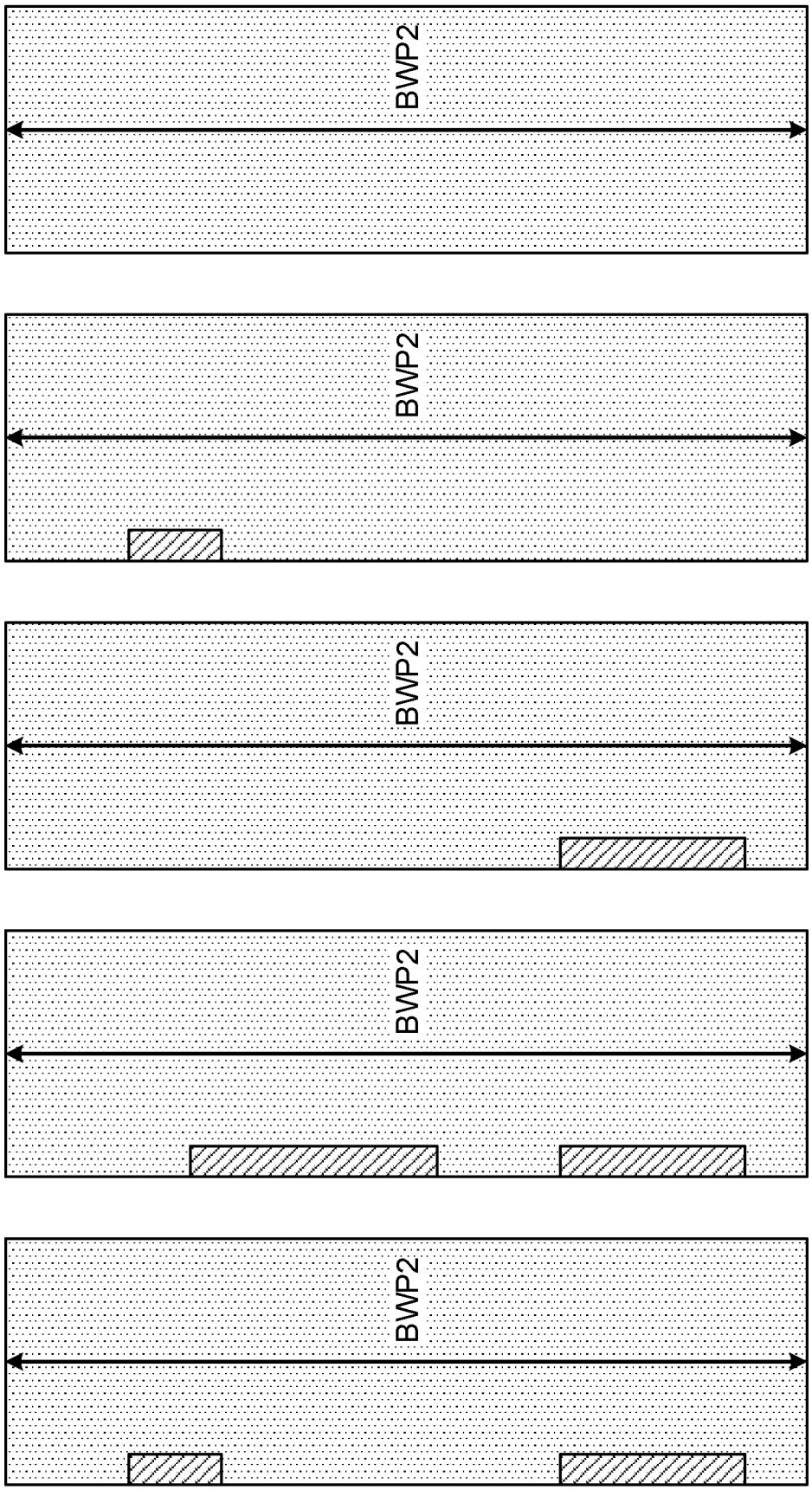
FIG. 5 is a diagram to show yet other examples of associations between BWPs and blank resources according to the first example.

FIG. 4 is a diagram to show other examples of associations between BWPs and blank resources according to the first example. FIG. 5 is a diagram to show yet other examples of associations between BWPs and blank resources according to the first example. FIG. 4 and FIG. 5 each show 5 examples of blank resource patterns that can be configured in association with BWP 1 and BWP 2, respectively.

For example, as shown in FIG. 4 from the left, UE may judge the blank resource pattern of a given BWP (for example, an active BWP) based on one of the following assumptions (it may be assumed that one of the following blank resource patterns is used):

(1) Multiple blank resources comprised of different numbers of PRBs are contained in a given period (for example, one or more symbols, one or more slots (mini-slots), etc.);

(2) Multiple blank resources comprised of the same number of PRBs are contained in a given period;

(3) 1 blank resource comprised of a given number of PRBs is contained in a given period;

(4) The whole bandwidth of a given BWP is a blank resource in a given period; and (5) No blank resource is contained in a given BWP in a given period. Here, above (1) to (3) may be interpreted as meaning that "part of the bandwidth of a given BWP is a blank resource in a given period." The number of PRBs may be interpreted as meaning "the number of subcarriers," "the number of subbands," and the like.

Note that "multiple blank resources," as used in these assumptions, may be multiple non-contiguous blank resources in time and/or frequency directions, or may be a plurality of blank resources that are contiguous (neighboring) in time and/or frequency directions.

In above (1) to (3), the number of PRBs in a blank resource may be represented by powers of a certain number (for example, 2), or may be represented by integer multiples or fractional multiples of a certain number (for example, 2, 3, 4, . . . ) and so on. In this case, it is easy to allocate blank resources and other resources (for example, resources where the PDSCH is allocated) without gaps, so that the decrease in spectral efficiency can be reduced.

In above (1) to (3), the location of 1 blank resource may be represented as a relative location with respect to another blank resource. The blank resource information may include information about this relative location. In this case, it is possible to prevent an increase in the amount of blank resource information.

In above (1) to (3), the location and/or the number of PRBs of 1 blank resource may be represented as relative values with respect to certain BWP configurations. For example, consider the case where a BWP with a bandwidth of 10 PRBs is the reference. Assuming that "1" is configured as the value to represent the number of PRBs in a blank resource, the absolute value of the number of PRBs may be judged to be 1 when the blank resource is included in a BWP having a bandwidth of 10 PRBs, and the absolute value of the number of PRBs may be judged to be 3 when the blank resource is included in a BWP having a bandwidth of 30 PRBs. In this case, it is possible to prevent an increase in the amount of blank resource information.

The BWP configurations to be referenced (or BWP configuration parameters) may be configured by higher layer signaling or the like, or may be defined by the specification.

The above assumption of (4) may be applied to BWP that fulfill certain conditions. For example, UE may employ above assumption (4) when the bandwidth of a given BWP is less than or equal to a certain value, and the UE does not have to employ above assumption (4) when the bandwidth of the given BWP is larger than the certain value. BWP 1 in FIG. 4 corresponds to an example in which the bandwidth is equal to or less than a certain value, and BWP 2 of FIG. 5 corresponds to an example in which the bandwidth is larger than a certain value.

Referring to above (5), the blank resource pattern may indicate that no blank resource is contained (there is no blank resource), that blank resources are contained (there are blank resources), and so on. The blank resource information may include information as to whether or not there are blank resource in a given period. This information regarding the presence/absence of blank resources can be represented, for example, by using 1 bit, so that the increase in the amount of blank resource information can be reduced.

With regard to (5) above, in the given BWP, CORESET resources may be included in the given period. In this case, the UE may perform receiving process for the PDSCH (for example, demodulation, decoding, rate matching, etc.) or transmission processes (for example, coding, modulation, etc.) for the PUSCH, in the given period, in consideration of the CORESET resources in the given period. Also, the UE may perform these receiving processes or transmission processes based on DCI received in a CORESET in another slot, mini-slot, and so forth.

According to the first example described above, blank resource patterns can be configured in a UE-specific manner and in a BWP-specific manner, so that flexible control is possible.

For example, when blank resources to match the above assumption of (1) are used, a number of different CORESETs configured in varying resource region sizes or the same CORESET configured in non-contiguous resources in the frequency domain can be multiplexed over blank resources of varying resource region sizes.

When blank resources to match the above assumption of (2) are used, applying the same resource region size to these multiple blank resources makes it easy to reduce the signaling overhead required for the configuration.

When a blank resource to match the above assumption of (3) is used, the signaling overhead can be reduced compared to the cases of (1) and (2) above.

When a blank resource to match the above assumption of (4) is used, a CORESET, no matter in what resource region size it is configured, can be multiplexed over the blank resource.

When blank resources to match the above assumption of (5) are used, no unnecessary blank resource is configured when a data channel is scheduled in a slot where CORESET is not configured, so that improved resource efficiency can be achieved.

Second Example

According to a second example of the present invention, when multiple BWPs are configured in UE, a blank resource pattern that is common to the multiple BWPs is configured in the UE.

UE may specify possible blank resource patterns, regardless of which BWP is active. The common blank resource pattern may be assumed to correspond to given time and frequency resources in the CC (system bandwidth) in which the BWP is included.

The UE may specify the common blank resource pattern based on higher layer signaling, physical layer signaling (for example, DCI) or a combination of these. Points in blank resource information, information included in BWP configurations and the like, the method of reporting such information, the method of specifying resource patterns and so on that are the same as in the first example will not be described again.

Every BWP configuration may include blank resource information explicitly or implicitly. Part of BWP configurations needs not include common blank resource information. Also, if UE can recognize common blank resource patterns, such as when common and blank resource patterns are specified by the specification, blank resource information needs not be included in any BWP configuration. Also, common blank resource information may be configured apart from BWP configurations.

UE may assume that the frequency resources of multiple BWPs overlap at least partially. Where there are a plurality of BWPs, the UE may assume that a blank resource pattern to use in a BWP having a narrower bandwidth is (or is included in) a resource pattern to use in a BWP having a wider bandwidth.

Figure 6:
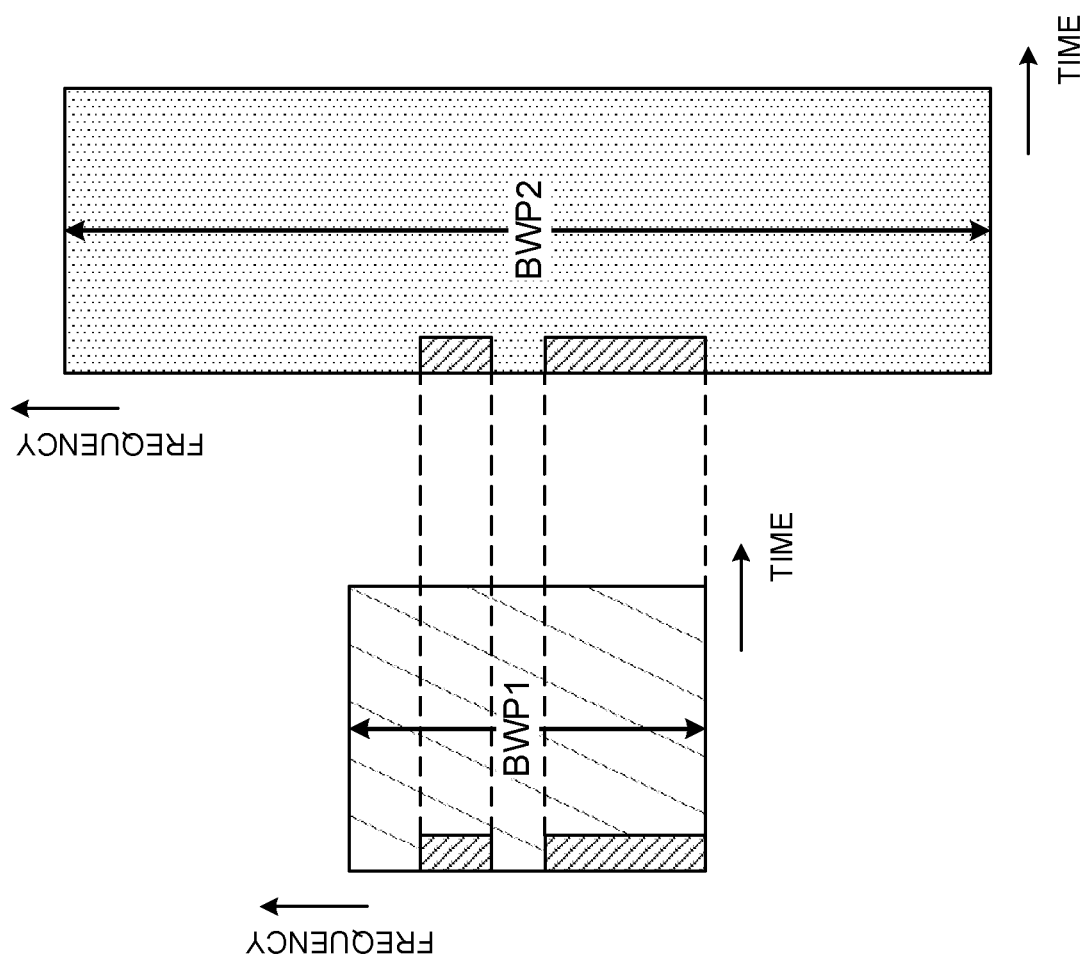
FIG. 6 is a diagram to show examples of associations between BWPs and blank resources according to a second example of the present invention.

FIG. 6 is a diagram to show examples of associations between BWPs and blank resources according to a second example of the present invention. In this example, BWP 1 and BWP 2 have varying bandwidths. The blank resources in BWP 1 and the blank resources in BWP 2 are configured, and may be located in the same time and frequency resources in a given slot. In this example, the common blank resource is located at the beginning of a slot near the center frequency of each BWP.

Note that, although the example of FIG. 6 has shown a case in which a common blank resource is a resource that is included in all of a plurality of BWPs, this is by no means limiting. For example, a common blank resource pattern may correspond to blank resources that span a bandwidth (for example, the system bandwidth) that is wider than the bandwidth of 1 BWP. Where there is an active BWP and a common resource pattern is provided, the UE needs to consider only those blank resources that are included in the band of this BWP.

In other words, among the blank resources included in a common blank resource pattern, the UE may ignore blank resources that are located outside the active BWP's range.

Figure 7:
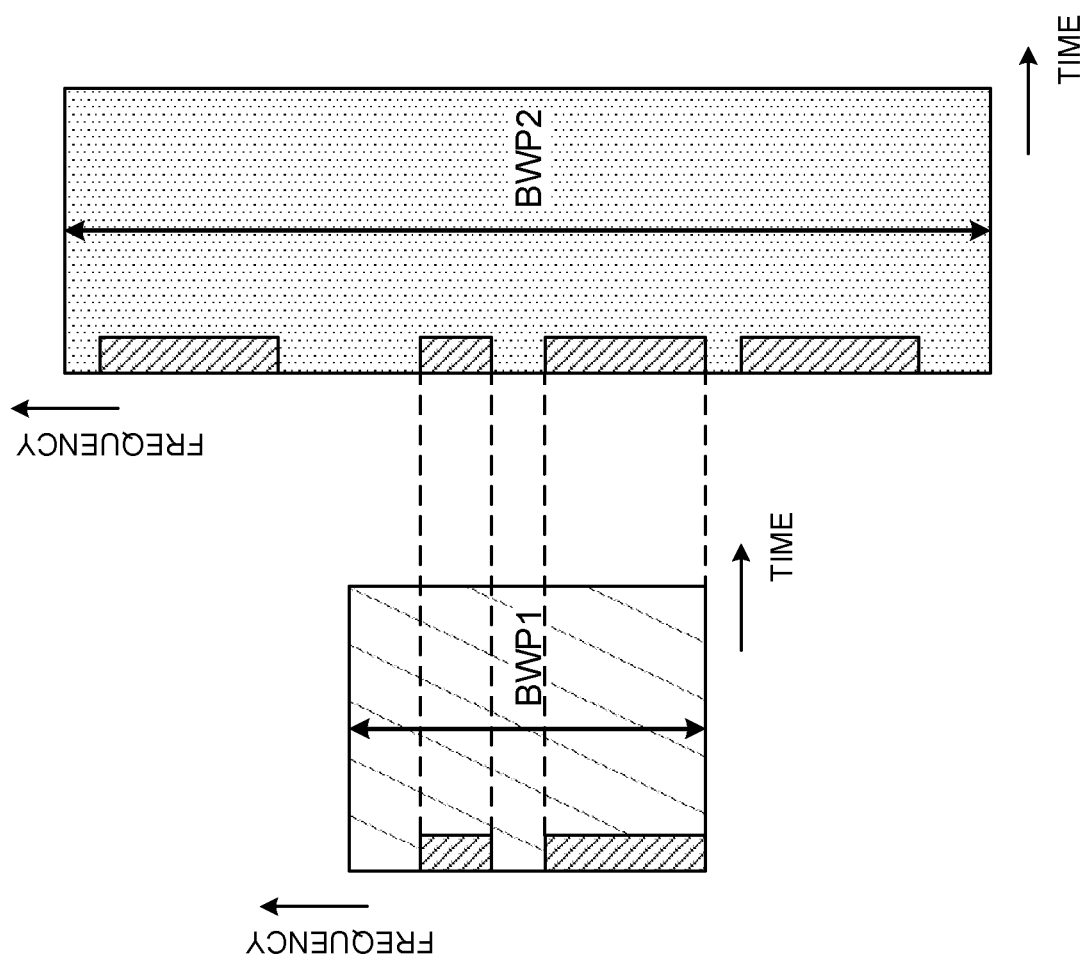
FIG. 7 is a diagram to show other examples of associations between BWPs and blank resources according to the second example.

FIG. 7 is a diagram to show other examples of associations between BWPs and blank resources according to the second example. The BWP configurations in this example are the same as in the example of FIG. 6. The blank resources in BWP 1 and the blank resources in BWP 2 are configured in common and span the bandwidth of BWP 2. When BWP 2 is active, the UE can consider the blank resources in BWP 2. When BWP 1 is active, the UE has only to consider the blank resources in BWP 1, in the common blank resource pattern.

According to the second example described above, blank resource patterns can be configured in a UE-specific manner and in a BWP-specific manner, so that flexible control is possible.

(Variations)

A blank resource pattern for DL (DL BWP) and a blank resource pattern for UL (UL BWP) may be both individually configured in UE, or may be configured in common. For example, referring back to the second example, a plurality of BWPs may include a DL BWP and a UL BWP.

The blank resource information may include at least one of DL blank resource information, which is used as a blank resource in a time unit (slot, mini-slot and so on) in which DL is scheduled, and UL blank resource information, which is used as blank resources in a time unit in which UL is scheduled.

The DL blank resource information may be included in configuration information of the DL BWP. The UL blank resource information may be included in configuration information of the UL BWP. Also, these types of blank resource information may be included, in one of DL BWP configuration information and/or UL BWP configuration information, as common blank resource information, or may be reported, apart from the BWP configuration information.

(Radio Communication System)

Now, the structure of a radio communication system according to embodiments of the present disclosure will be described below. In this radio communication system, the radio communication methods according to the above-described examples are employed. Note that the radio communication methods according to the herein-contained examples of the present invention may be applied individually, or may be combined and applied.

Figure 8:
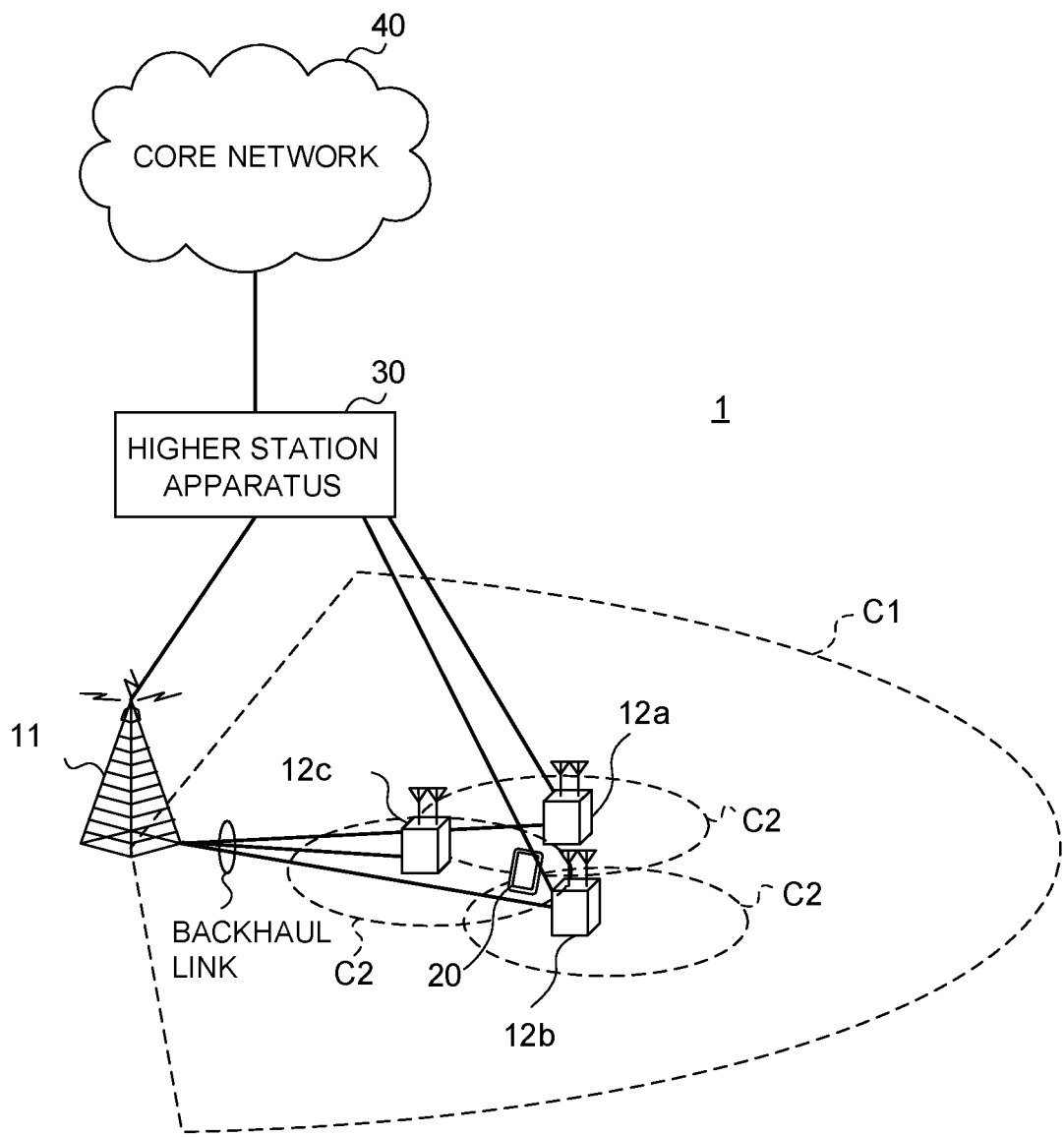
FIG. 8 is a diagram to show an exemplary schematic structure of a radio communication system according to one embodiment.

FIG. 8 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 8 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells may be adopted. Note that a "numerology" refers to a set of communication parameters that characterize the design of signals in a given RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, 2 or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), a slot having a relatively long time length (for example, 1 ms) (also referred to as a "TTI," a "normal TTI," a "long TTI," a "normal subframe," a "long subframe," a "subframe" and so forth) and/or a slot having a relatively short time length (also referred to as a "mini-slot," a "short TTI," a "short subframe," and so forth) may be used. Furthermore, in each cell, subframes of 2 or more time lengths may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, optical fiber, which is in compliance with the CPRI (Common Public Radio Interface), the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system band into bands formed with one or continuous resource blocks per terminal, and allowing a number of terminals to use mutually different bands. Note that the uplink and downlink radio access schemes are not limited to the combinations of these, and OFDMA may be used in UL. Also, SC-FDMA can be applied to a side link (SL) that is used in inter-terminal communication.

In the radio communication system 1, a DL data channel (PDSCH (Physical Downlink Shared CHannel), also referred to as a DL shared channel and/or the like), which is used by each user terminal 20 on a shared basis, a broadcast channel (PBCH (Physical Broadcast CHannel)), L1/L2 control channels and so on are used as DL channels. At least one of user data, higher layer control information, SIBs (System Information Blocks) and so forth is communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH retransmission control information (also referred to as "A/N," "HARQ-ACK," "HARQ-ACK bit," "A/N codebook" and so on) can be communicated using at least one of the PHICH, the PDCCH and the EPDCCH.

In the radio communication system 1, a UL data channel (PUSCH (Physical Uplink Shared CHannel), also referred to as a UL shared channel and/or the like), which is used by each user terminal 20 on a shared basis, an UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of retransmission control information (for example, A/N, HARQ-ACK) for the PDSCH, channel state information (CSI) and so on is communicated in the PUSCH or the PUCCH. By means of the PRACH, random access preambles for establishing connections with cells are communicated.

<Radio Base Station>

Figure 9:
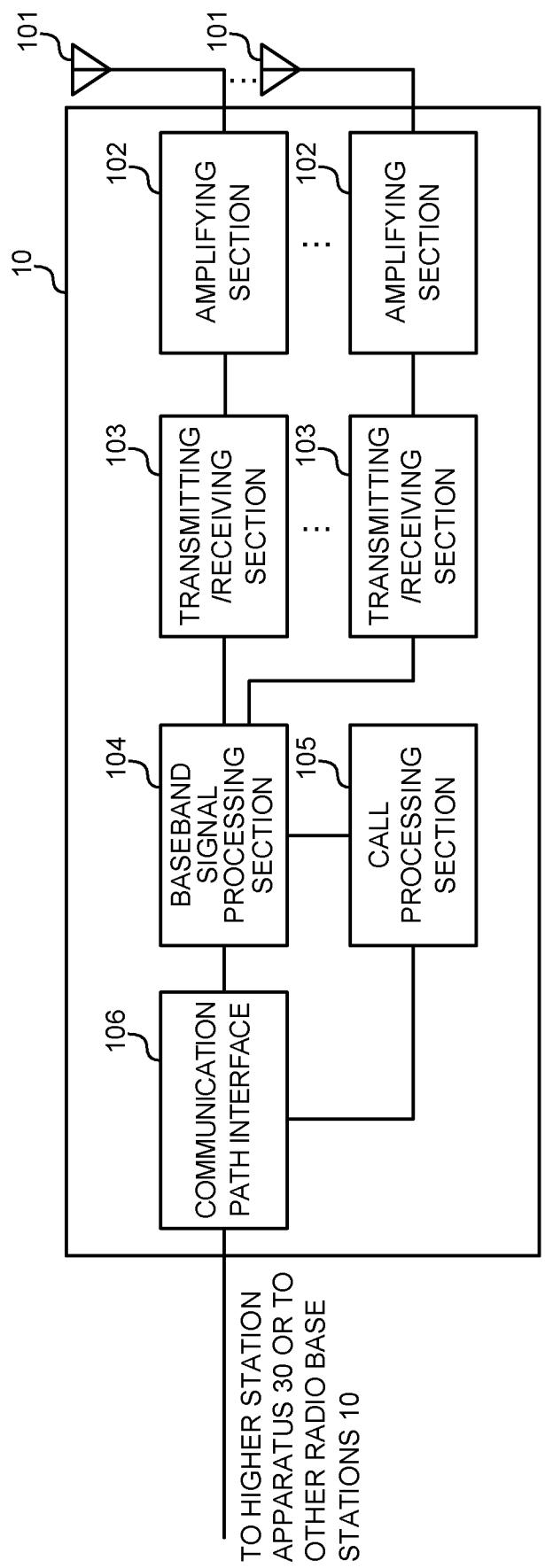
FIG. 9 is a diagram to show an exemplary overall structure of a radio base station according to one embodiment.

FIG. 9 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided. The radio base station 10 may be "receiving apparatus" in UL and "transmitting apparatus" in DL.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, rate matching, scrambling, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a certain interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

Also, the transmitting/receiving sections 103 transmit DL signals (for example, at least one of DCI (including at least one of DL assignment, UL grant, and common DCI), DL data (channel), reference signals, and high layer control information) and/or receive UL signals (for example, at least one of UL data (channel), UCI, reference signals, and higher layer control information).

To be more specific, the transmitting/receiving sections 103 may transmit a DL data channel (for example, PDSCH) in transmission periods of variable length (for example, slots, mini-slots, a certain number of symbols, and so on), and/or receive a UL data channel (for example, PUSCH).

The transmitting/receiving sections 103 may perform transmission and/or receiving processes by taking blank resource regions into account. The transmitting/receiving sections 103 may not perform transmission and/or receiving processes for given signals (for example, PDSCH, PUSCH and so on) in blank resource regions.

Figure 10:
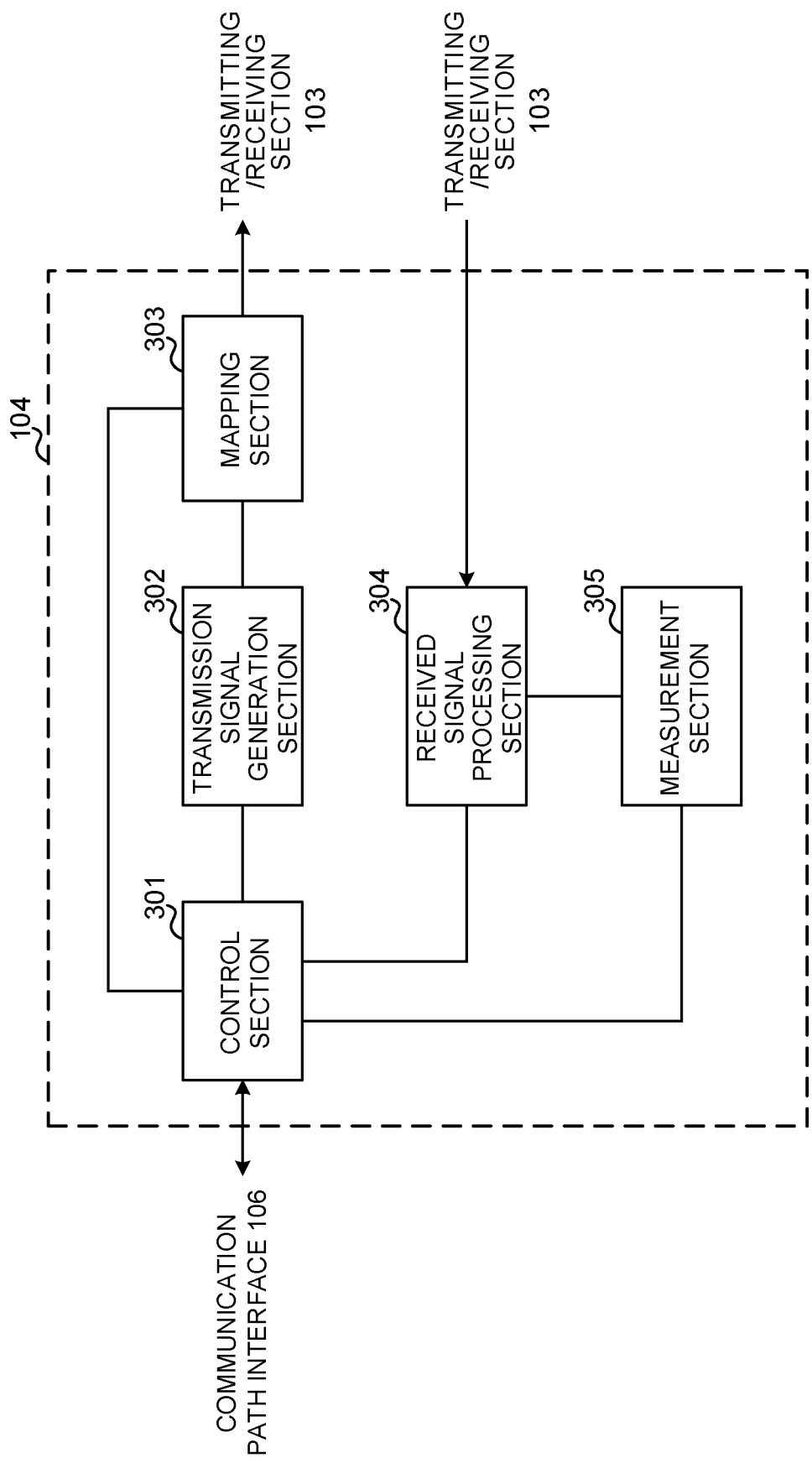
FIG. 10 is a diagram to show an exemplary functional structure of a radio base station according to one embodiment.

FIG. 10 is a diagram to show an exemplary functional structure of a radio base station according to one embodiment of the present invention. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305. Also, the control section 301 may control the scheduling of data channels (including DL data channels and/or UL data channels).

The control section 301 may select a blank resource region for a user terminal (blank resource pattern) in association with a given bandwidth part (BWP). The control section 301 may control the transmission and/or receiving processes taking the blank resource regions into account.

The control section 301 may exert control so that information about blank resource regions is transmitted to the user terminal 20. For example, the control section 301 may exert control so that information about a blank resource region in an active BWP is included and reported in the configuration information of the this active BWP. The control section 301 may exert control so that information about a blank resource region in an active BWP is included and reported in the configuration information of the this active BWP. Note that this common blank resource region may contain a resource field located outside the frequency band of at least one of a number of BWPs configured in the user terminal 20.

The control section 301 may select blank resource regions based on one of following assumptions (1) to (3):

(1) In a given period, the whole bandwidth of a given BWP (for example, an active BWP) is a blank resource region;

(2) In a given period, part of the bandwidth of a given BWP is a blank resource region; and (3) In a given period, the given BWP contains no blank resource region.

The control section 301 can be constituted by a controller, a control circuit or control apparatus that can be described based on general understanding of the technical field to which the present invention pertains.

The transmission signal generation section 302 may generate DL signals (including at least one of DL data (channel), DCI, DL reference signals, control information to be sent in higher layer signaling) as commanded from the control section 301, and output these signals to the mapping section 303.

The transmission signal generation section 302 can be constituted by a signal generator, a signal generation circuit or signal generation apparatus that can be described based on general understanding of the technical field to which the present invention pertains.

The mapping section 303 maps the DL signals generated in the transmission signal generation section 302 to certain radio resources based on commands from the control section 301, and outputs these to the transmitting/receiving sections 103. For example, the mapping section 303 maps reference signals to certain radio resources in allocation patterns determined by the control section 301.

The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) for UL signals transmitted from the user terminal 20. For example, the received signal processing section 304 may demodulate a UL data channel by using a reference signal that is provided in an allocation pattern determined in the control section 301. To be more specific, the received signal processing section 304 may output the received signals, the signals after the receiving processes and so on, to the measurement section 305.

For the received signal processing section 304, a signal processor, a signal processing circuit or signal processing apparatus that can be described based on general understanding of the technical field to which the present invention pertains can be used. Also, the received signal processing section 304 can constitute the receiving section according to the present invention.

The measurement section 305 may measure UL channel quality based on, for example, the received power (for example, RSRP (Reference Signal Received Power)) and/or the received quality (for example, RSRQ (Reference Signal Received Quality)) of reference signals. The measurement results may be output to the control section 301.

(User Terminal)

Figure 11:
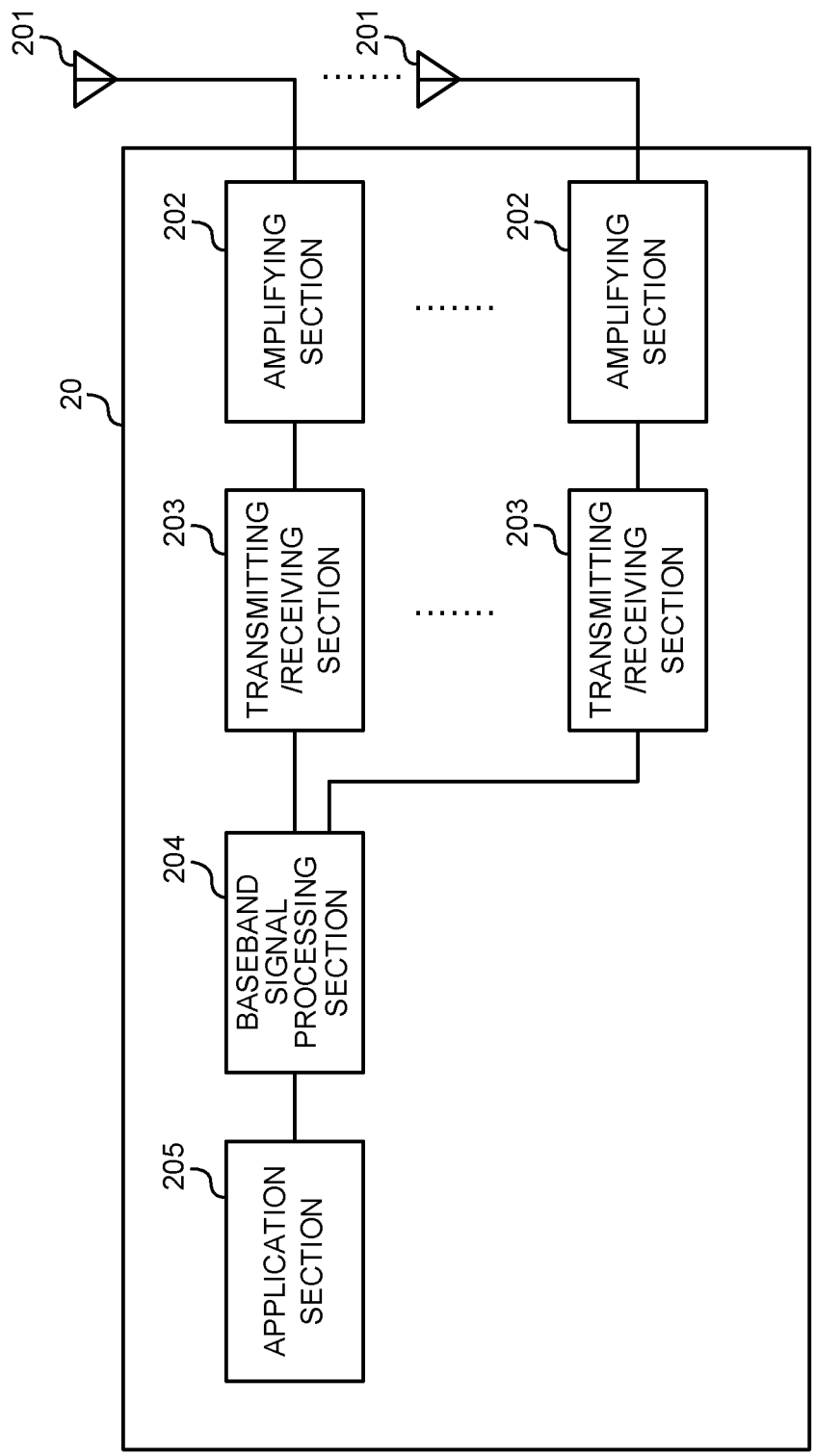
FIG. 11 is a diagram to show an exemplary overall structure of a user terminal according to one embodiment.

FIG. 11 is a diagram to show an exemplary overall structure of a user terminal according to one embodiment of the present invention. A user terminal 20 has a plurality of transmitting/receiving antennas 201 for MIMO communication, amplifying sections 202, transmitting/receiving sections 203, a baseband signal processing section 204 and an application section 205. The user terminal 20 may be "transmitting apparatus" in UL and "receiving apparatus" in DL.

Radio frequency signals that are received in a plurality of transmitting/receiving antennas 201 are each amplified in the amplifying sections 202. Each transmitting/receiving sections 203 receive the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving sections 203. UCI (including, for example, at least one of an A/N in response to a DL signal, channel state information (CSI) and a scheduling request (SR), and/or others) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive DL signals (for example, at least one of DCI (including at least one of DL assignment, UL grant, and common DCI) DL data (channel), reference signals and higher layer control information) and/or transmit UL signals (for example, at least one of UL data (channel), UCI, reference signals and high layer control information).

To be more specific, the transmitting/receiving sections 103 may transmit DL data channels (for example, PDSCH) in transmission periods of variable length (for example, slots, mini-slots, a certain number of symbols, and so on), and/or receive UL data channels (for example, PUSCH).

The transmitting/receiving sections 203 may perform transmission and/or receiving processes by taking blank resource regions into account. The transmitting/receiving sections 203 may not perform transmission and/or receiving processes for given signals (for example, PDSCH, PUSCH and so on) in blank resource regions.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as 1 transmitting/receiving section, or may be formed with a transmitting section and a receiving section.

Figure 12:
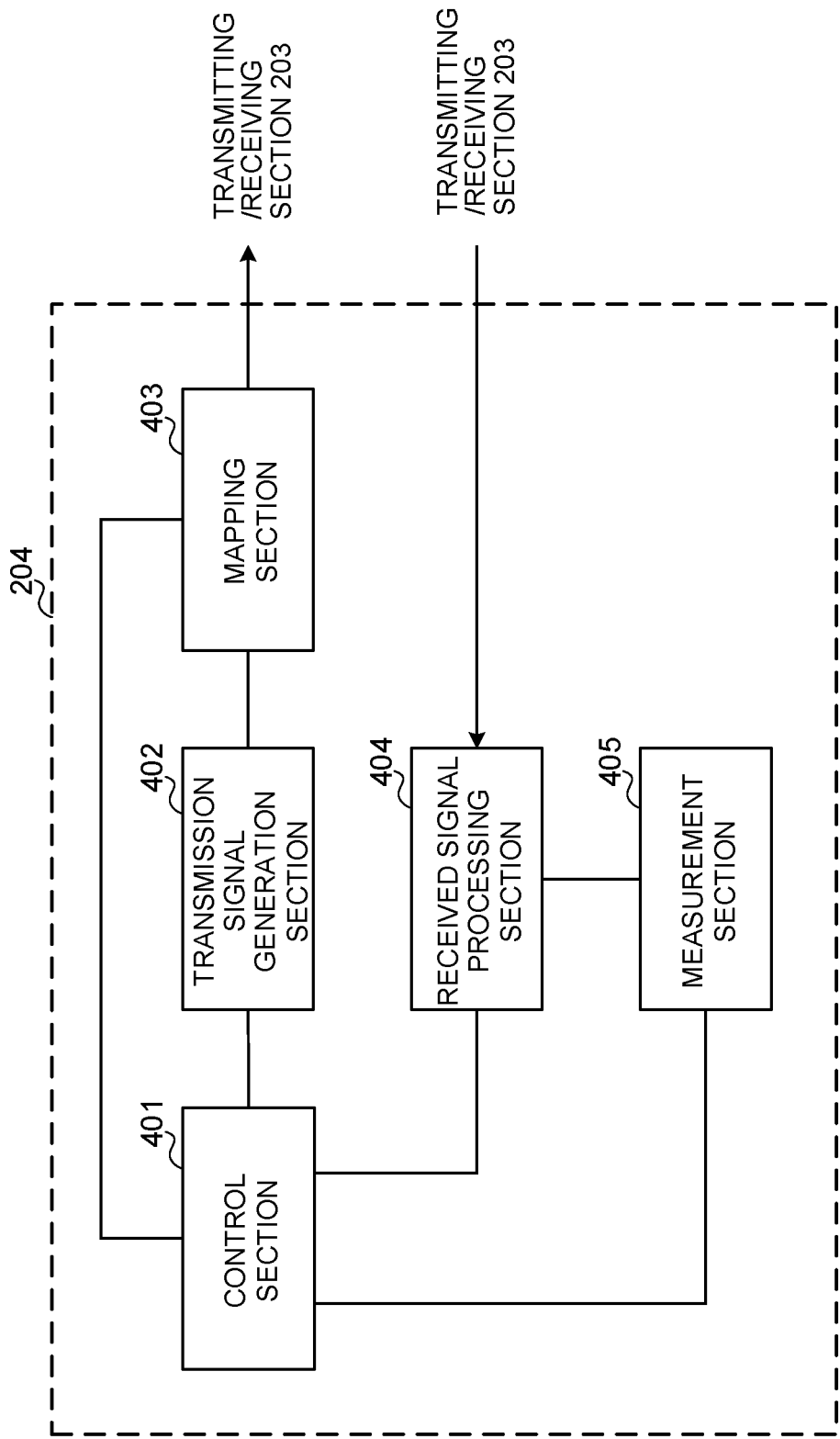
FIG. 12 is a diagram to show an exemplary functional structure of a user terminal according to one embodiment.

FIG. 12 is a diagram to show an exemplary functional structure of a user terminal according to one embodiment of the present invention. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

To be more specific, the control section 401 may monitor (blind-decode) a DL control channel and detect DCI that schedules data channels for the user terminal 20. The control section 401 may control the receipt of a DL data channel based on this DCI. Also, the control section 401 may control the transmission of a UL data channel based on this DCI.

The control section 401 may select a blank resource region (blank resource pattern) in association with a given bandwidth part (BWP). The control section 401 may control the transmission and/or receiving processes taking this blank resource region into account.

The control section 401 may select an active BWP blank resource region based on configuration information of this active BWP. The control section 401 may assume that the blank resource region in the active BWP is included in a blank resource region that is included in multiple BWPs in common. Note that this common blank resource region may contain a resource field that is located outside the frequency band of the active BWP.

The control section 401 may select blank resource regions based on one of following assumptions (1) to (3):

(1) In a given period, the whole bandwidth of a given BWP (for example, an active BWP) is a blank resource region;

(2) In a given period, part of the bandwidth of a given BWP is a blank resource region; and (3) In a given period, the given BWP contains no blank resource region.

The control section 401 can be constituted by a controller, a control circuit or control apparatus that can be described based on general understanding of the technical field to which the present invention pertains.

The transmission signal generation section 402 generates retransmission control information for UL signals and DL signals as commanded from the control section 401 (including performing encoding, rate matching, puncturing, modulation and/or other processes), and outputs this to the mapping section 403. The transmission signal generation section 402 can be constituted by a signal generator, a signal generation circuit or signal generation apparatus that can be described based on general understanding of the technical field to which the present invention pertains.

The mapping section 403 maps the retransmission control information for UL signals and DL signals generated in the transmission signal generation section 402 to radio resources, as commanded from the control section 401, and outputs these to the transmitting/receiving sections 203. For example, the mapping section 403 maps reference signals to certain radio resources in allocation patterns determined by the control section 401.

The mapping section 403 can be constituted by a mapper, a mapping circuit or mapping apparatus that can be described based on general understanding of the technical field to which the present invention pertains.

The received signal processing section 404 performs receiving processes of DL signals (including, for example, at least one of demapping, demodulation and decoding). For example, the received signal processing section 404 may demodulate a DL data channel by using a reference signal provided in an allocation pattern determined by the control section 401.

Also, the received signal processing section 404 may output the received signals and/or the signal after the receiving process to the control section 401 and/or the measurement section 405. The received signal processing section 404 outputs, for example, higher layer control information to be sent in higher layer signaling, L1/L2 control information (for example, UL grant and/or DL assignment) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting 2 or more physically and/or logically separate pieces of apparatus (via wire or wireless, for example) and using these multiple pieces of apparatus.

Figure 13:
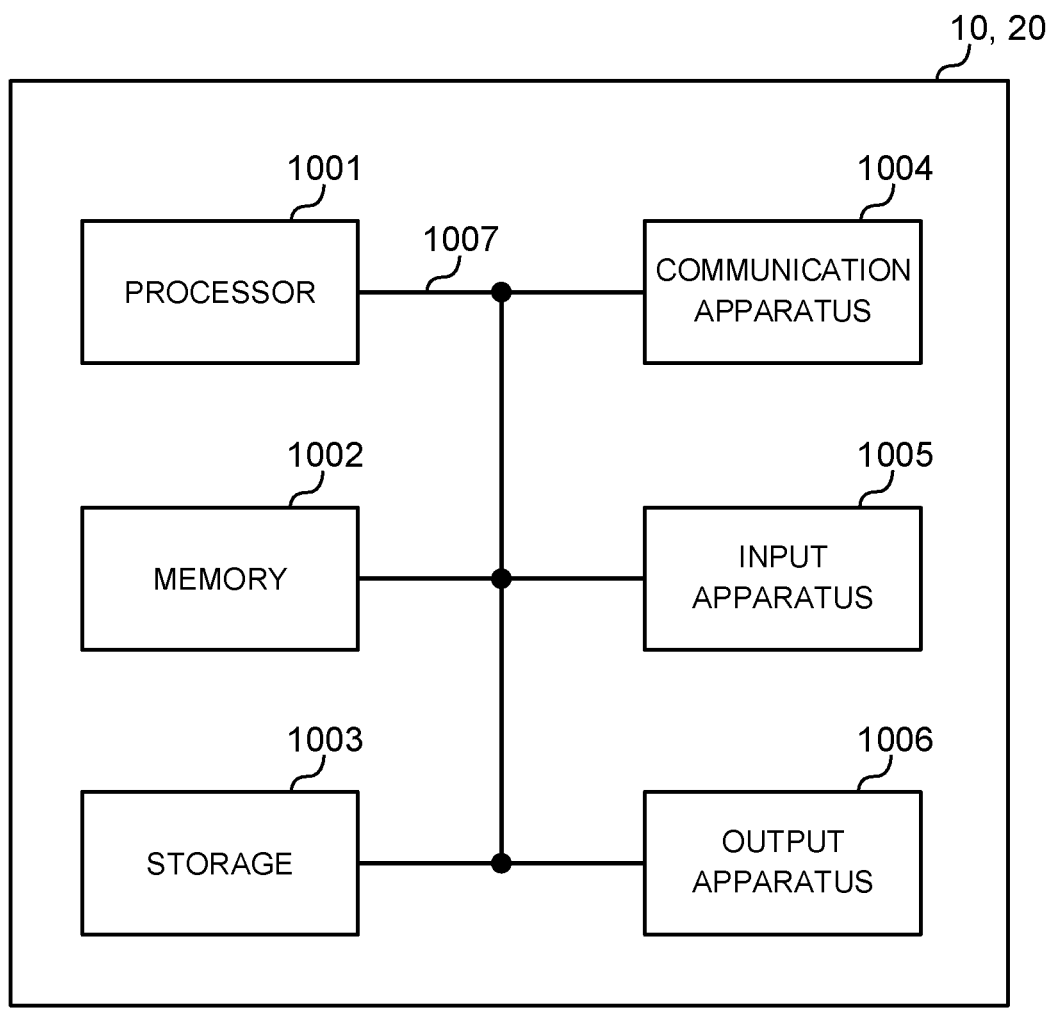
FIG. 13 is a diagram to show an exemplary hardware structure of a radio base station and a user terminal according to one embodiment.

For example, the radio base station, user terminals and so on according to embodiments of the present invention may function as a computer that executes the processes of the radio communication method of the present invention. FIG. 13 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and the user terminal 20 is implemented by reading certain software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single-carrier Frequency Division Multiple Access) symbols, and so on). Also, a slot may be a time unit based on numerology. Also, a slot may include a plurality of mini-slots. Each mini-slot may be comprised of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini-slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 mini-slot is referred to as a "TTI," one or more TTIs (that is, one or multiple slots or one or more mini-slots) may be the minimum time unit of scheduling. Also, the number of slots (the number of mini-slots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. Also, an RB may include one or more symbols in the time domain, and may be 1 slot, 1 mini-slot, 1 subframe or 1 TTI long. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, mini-slots, symbols and so on described above are simply examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to certain values, or may be represented using other applicable information. For example, a radio resource may be specified by a certain index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent implicitly (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideB and), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between 2 or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between 2 or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives configuration information about a Bandwidth part (BWP)-specific reserved resource for a BWP; and
a processor that determines, based on subcarrier spacing of the BWP, information related to a reserved resource corresponding to the configuration information,
wherein the processor performs rate matching of a physical downlink shared channel in a slot where the reserved resource is included.

2. An apparatus comprising:
a receiver that receives configuration information about a Bandwidth part (BWP)-specific reserved resource for a BWP;
a processor that determines, based on subcarrier spacing of the BWP, information related to a reserved resource corresponding to the configuration information; and
an output apparatus that outputs information based on a physical downlink shared channel,
wherein the processor performs rate matching of the physical downlink shared channel in a slot where the reserved resource is included.

3. The apparatus according to claim 2, wherein the output apparatus is at least one of a display, a speaker and a touch panel.

4. A system comprising:
an apparatus that comprises:
a receiver that receives configuration information about a Bandwidth part (BWP)-specific reserved resource for a BWP; and
a processor that determines, based on subcarrier spacing of the BWP, information related to a reserved resource corresponding to the configuration information,
wherein the processor performs rate matching of a physical downlink shared channel in a slot where the reserved resource is included and
a base station that comprises:
a transmitter that transmits the configuration information to the apparatus.

5. A radio communication method for a terminal, comprising:
receiving configuration information about a Bandwidth part (BWP)-specific reserved resource fora BWP;
determining, based on subcarrier spacing of the BWP, information related to a reserved resource corresponding to the configuration information; and
performing rate matching of a physical downlink shared channel in a slot where the reserved resource is included.

6. A base station comprising:
a transmitter that transmits, to a terminal, configuration information about a Bandwidth part (BWP)-specific reserved resource for a BWP in order to cause the terminal to perform rate matching of a physical downlink shared channel in a slot where a reserved resource corresponding to the configuration information is included;
a processor that controls transmission of the physical downlink shared channel,
wherein the processor determines, based on subcarrier spacing of the BWP, information related to the reserved resource.

* * * * *